United States Patent [19]
Sklenak et al.

[11] Patent Number: 5,135,645
[45] Date of Patent: Aug. 4, 1992

[54] REFRIGERATOR WATER FILTER

[75] Inventors: John S. Sklenak, Sudbury; Sol Aisenberg, Natick; Thomas J. Martel, Peabody, all of Mass.

[73] Assignee: Raytheon Company, Lexington, Mass.

[21] Appl. No.: 676,416

[22] Filed: Mar. 28, 1991

[51] Int. Cl.⁵ .................. B01D 27/00; B01D 35/02; B01D 35/157

[52] U.S. Cl. .................. 210/097; 210/117; 210/136; 210/184; 210/186; 210/234; 210/435; 210/437; 210/438; 210/439; 210/441; 210/442; 210/446; 210/739; 62/338; 62/339

[58] Field of Search ............... 210/739, 767, 774, 175, 210/184, 186, 234, 435, 437, 438, 439, 440, 441, 442, 443, 444, 446, 136, 117, 97, 103; 62/338, 339, 340; 251/11, 117

[56] References Cited

U.S. PATENT DOCUMENTS

| | | | |
|---|---|---|---|
| 3,982,406 | 9/1976 | Hanson et al. | 62/339 |
| 4,561,979 | 12/1985 | Harms et al. | 210/438 |
| 4,808,302 | 2/1989 | Beall, Jr. | 210/117 |
| 4,815,497 | 3/1989 | Pick | 251/117 |
| 5,049,269 | 9/1991 | Shah | 210/234 |

Primary Examiner—Robert A. Dawson
Assistant Examiner—Sun Uk Kim
Attorney, Agent, or Firm—Judith A. Caplan; Richard M. Sharkansky

[57] ABSTRACT

A water filter system for use in refrigerators having water dispenser and/or icemaker features. The filter system includes a commercially available filter cartridge which removes common water contaminants. A shut off valve temporarily stops the flow of water to the filter to permit replacement of the cartridge. The filter is disposed within the refrigerator for easy access and may be further disposed in a recess in one of the refrigerator walls or the refrigerator door to avoid reducing the useable food storage volume. The shut off valve may be closed by activating a conveniently located switch, by opening the refrigerator door, by opening a cover over the recess, or alternatively may be normally closed and opened only in response to activation of the icemaker or water dispenser features.

25 Claims, 6 Drawing Sheets

REFRIGERATOR WATER FILTER

BACKGROUND OF THE INVENTION

This invention relates generally to water filtration and more particularly to water filtration devices adapted for use in refrigerators.

As it is known in the art, various contaminants which affect the appearance, taste, smell, and safety of water are found in water supplies Such contaminants found in drinking water supplies have become an increasing cause for concern among consumers. Common water contaminants are sand, rust, dirt, chlorine, and pesticides; whereas, contaminants such as heavy metals, nitrates, and radon are somewhat less common.

As it is also known in the art, various options exist for those affected by contaminated drinking water supplies. One option is to purchase purified water in bottles. However, bottled water may be an expensive and inconvenient option. Alternatively, a water purification system may be installed to treat all of the water entering a home. This type of system is typically referred to as a "point of entry" system and operates by using granular activated charcoal, silver impregnated ceramic, deionization, distillation or reverse osmosis, or a combination thereof. Such systems may be unnecessarily expensive, particularly in areas affected only by the more common water contaminants However, in areas where the water contains a large sulfur dioxide, iron, or manganese content, a "point of entry" system may be required in order to protect the plumbing from corrosion.

Alternatively, a "point of use" water filtration system may be installed on faucets used for drinking water or on appliances that use water. One example of a "point of use" system is the "Instapure" water filter made by Teledyne Water Pik of Fort Collins, Colo. which is installed on a faucet. This system includes a cartridge having a prefilter to trap rust and dirt and further includes a carbon section that removes harmful chemicals and chlorine, thereby eliminating the more common contaminants.

As it is also known in the art, many refrigerators have ice making and water dispensing features. The water which enters the refrigerator for use with these features is supplied from the potentially contaminated home water supply. In areas affected by a contaminated water supply, it may be desirable to filter the water entering the refrigerator.

One technique known in the art for filtering water entering a refrigerator is to sever the conduit which carries water into the refrigerator and install a filter in the water line. Generally, this installation is done by a refrigerator serviceman. Fixtures suitable for mating with a commercially available filter cartridges, are installed on the severed ends of the conduit. An example of a suitable filter cartridge is made by Teledyne Water Pik, Model IR-30. For maximum efficiency, this type of filter cartridge requires periodic replacement.

Various problems are associated with the us of the above described refrigerator filter system. Most apparent is the lack of accessibility to the filter cartridge for periodic replacement of the cartridge. Since, typically, the back of the refrigerator must be accessed, the replacement of the filter cartridge may be cumbersome in cases where the refrigerator must be moved. Also, if the person replacing the filter fails to shut off the incoming water supply, removal of the cartridge from the pressurized water line would cause a large amount of water to flow out of the water line. Furthermore, even if the water supply is shut off prior to removal of the cartridge, some residual water in the conduit is likely to spill onto the floor.

SUMMARY OF THE INVENTION

It is an object of the present invention to provide a refrigerator water filtration system in which the replaceable filter cartridge is readily accessible.

It is another object to provide a refrigerator filtration system in which the filter cartridge is accessible without moving the refrigerator It is another object of the present invention to provide a refrigerator with a water filter system having a filter cartridge which is easily replaceable.

A further object is to provide a refrigerator water filter system having a drain feature to alleviate spillage of water when the filter cartridge is removed.

It is yet a further object of the present invention to provide a refrigerator water filter system in which the filter is disposed in the refrigerator and the water supply to the refrigerator is shut off in response to opening the refrigerator door.

A further object is to provide such a filter system in which the water supply to the refrigerator is shut off in response to removal of the filter cartridge.

In accordance with the present invention, a refrigerator includes an outer cabinet, a refrigeration compartment disposed within the outer cabinet, and a freezer also disposed in the outer cabinet and adjacent to the refrigeration compartment. The refrigeration compartment has a rear wall, a pair of opposing side walls, and a door disposed opposite the rear wall. The refrigerator further includes a water dispenser disposed in the door and having a water dispensing switch An icemaking device is disposed in the freezer compartment and includes a water flow switch. A filter, disposed in the refrigeration compartment, has an input port and an output port with the input port being selectively coupled to the water dispenser in response to activation of the water dispensing switch and to the icemaking device in response to activation of the water flow switch. The refrigerator further includes a water line for providing a flow of water to the input port of the filter and a valve disposed between the water line and the input port of the filter. The refrigerator may further include means, responsive to the removal of the filter, for closing the valve.

With this arrangement, a refrigerator is provided having a filter for purifying the water used therein in conjunction with icemaking and water dispensing features. The filter is accessible from inside the refrigerator and the water flow thereto may be stopped by activating a switch, opening the refrigerator door, or commencing the removal of the filter.

In accordance with an alternate embodiment of the present invention, a water filtration device includes a housing having an water inlet, a water outlet, and a drain outlet. A recess is disposed within the housing and has a first port, a second port, and a third port disposed therein. The first port is coupled to the water inlet, the second port to the water outlet, and the third port to the drain outlet. A water filtration cartridge is disposed over the recess and has an input port adapted for mating with the first port and an output port adapted for mating with the second port. The filtration device may further include a cover disposed over the cartridge.

With such arrangement, an easily accessible refrigerator water filtration system provides drainage of residual water in the water line when the filter cartridge is removed. This drain feature alleviates the potential leaking of water from the water line into the refrigerator.

BRIEF DESCRIPTION OF THE DRAWINGS

The foregoing features of this invention, as well as the invention itself, may be more fully understood from the following detailed description of the drawings in which.

DESCRIPTION OF THE PREFERRED EMBODIMENTS

Figure 1:
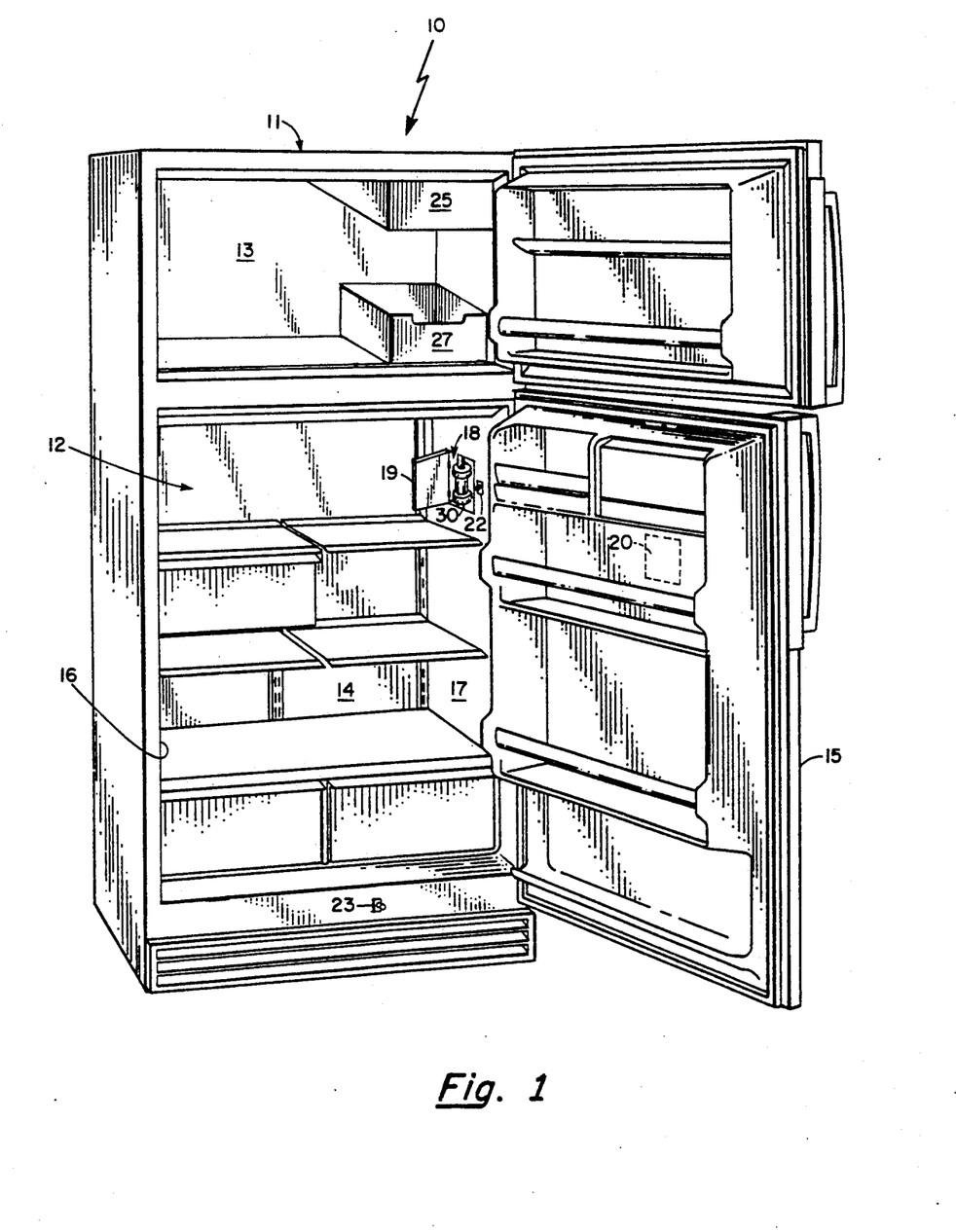
FIG. 1 is a refrigerator having a water filter system in accordance with the present invention.

Referring now to FIG. 1, a refrigerator 10 includes an outer cabinet 11 in which is disposed a refrigeration compartment 12 and a freezer compartment 13. The refrigeration compartment 12 includes rear wall 14 and a door 15, which, when closed, is parallel to rear wall 14. Refrigeration compartment 12 further includes parallel opposing side walls 16 and 17. Freezer compartment 13 is disposed adjacent to the refrigeration compartment 12. Here, freezer compartment 13 is disposed above refrigeration compartment 12; however, alternatively the freezer compartment 13 may be disposed below or side by side with refrigeration compartment 12.

A conventional water dispenser 20 is disposed within the door 15 of refrigeration compartment 12. Water dispenser 20 includes a water dispensing switch 21 (FIGS. 2 and 3) which, when activated, causes water to flow out of the dispenser 20. Access to water dispenser 20 and water dispensing switch 21 is from the outside of refrigerator door 15, as is conventional. Refrigerator 10 further includes an icemaker 25 disposed within the freeze compartment 13 as shown. Icemaker 25 is a conventional refrigerator feature in which the flow of water to the icemaker 25 is controlled by a timer (not shown). More particularly, icemaker 25 includes a water flow switch 26 (FIGS. 2 and 3) which is generally activated by a cam (not shown), the motion of which, in turn, is controlled by the timer. Disposed under icemaker 25 is an ice receptacle 27 into which the ice made by icemaker 25 is deposited.

Refrigerator 10 also includes a filter 30 through which water entering refrigerator 10 for use in conjunction with water dispenser 20 and icemaker 25 flows. In the embodiment of FIG. 1, a wall of refrigeration compartment 12, here, side wall 17, but alternatively side wall 16 or rear wall 14, has a recess 18 disposed therein. Filter 30 is disposed in recess 18 in order to avoid reducing the volume useable for food storage in the refrigeration compartment 12. Recess 18 has a cover 19 adapted to open and permit access to filter 30 or close to cover such filter 30. When cover 19 is closed, it contacts a microswitch 22, the function of which will described hereinafter. Refrigerator 10 further includes a door switch 23 which is activated when door 15 is closed. Again, the function of switch 23 in conjunction with the present invention will be understood from the following discussion.

Figure 2:
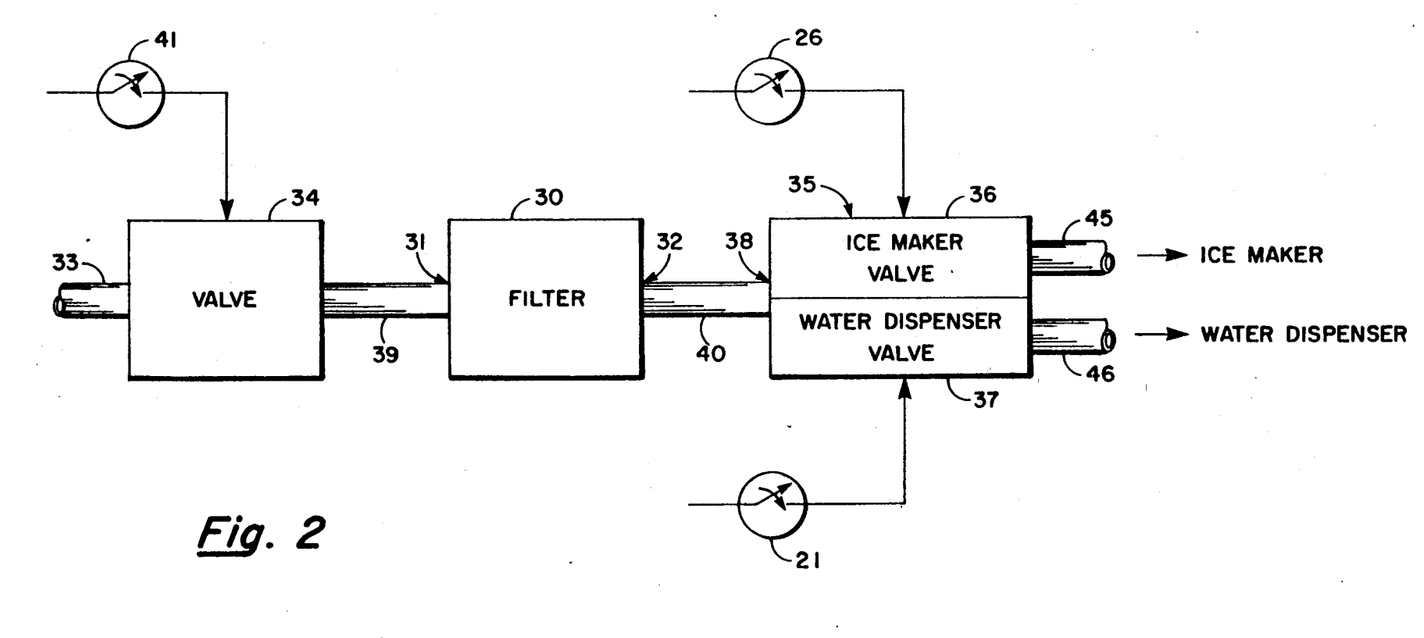
FIG. 2 is a schematic block diagram of a water flow arrangement for use in the refrigerator of FIG. 1.

Referring now also to FIG. 2, a water flow arrangement in accordance with the present invention includes conduit 33 through which water enters refrigerator 10. Conduit 33 is coupled to a valve 34, which, here, is a solenoid controlled valve. Valve 34 is further coupled to an input port 31 of filter 30 by conduit 39. Filter 30 has an output port 32 which is coupled to a valve arrangement 35 by conduit 40. More particularly, valve arrangement 35 has an input port 38 and comprises two values 36 and 37. Valve 36 regulates the flow of water to icemaker 25 via conduit 45 and is controlled by water flow switch 26. Similarly, valve 37 regulates the flow of water to water dispenser 20 via conduit 46 and is controlled by water dispensing switch 21.

Filter 30 includes a filter cartridge 42 (FIGS. 4-5) which requires periodic replacement. Valve 34 is normally open and must be closed when the filter cartridge 42 is replaced in order to avoid having water spill into the refrigeration compartment 12. Valve 34 is controlled by a switch 41 which may be a manually operated switch disposed at a convenient location inside refrigerator 10. For example, it may be desirable to locate such switch 41 adjacent to the filter 30 to provide a reminder to activate the switch 41 prior to replacing the filter cartridge 42.

Alternatively, microswitch 22 (FIG. 1) may be used in place of switch 41 to control valve 34. Specifically, when cover 19 is opened, microswitch 22 is activated and causes valve 34 to close. Conversely, when cover 19 is closed, microswitch 22 is de-activated and valve 34 is opened. In this way, the flow of water to filter 30 is shut off by the opening of cover 19. Thus, since cover 19 must be opened to access cartridge 42, operator error in failing to activate switch 41 prior to removing filter cartridge 42 is avoided.

Another alternative for controlling valve 34 is door switch 23 (FIG. 1). Conventionally, door switch 23 is activated when the door 15 is opened in order to turn on a refrigerator light (not shown). Door switch 23 may additionally control valve 34 so that when the door 15 is opened and door switch 23 is activated, valve 34 is closed. As described above with regard to the use of microswitch 22 for controlling valve 34, the use of door switch 23 for this purpose similarly alleviates the potential problem of failing to activate switch 41 to shut off the flow of water to filter 30 prior to replacement of the cartridge 42. In other words, whenever refrigerator door 15 is opened, valve 34 is closed, thus shutting off the flow of water to the filter 30. Since the refrigerator door 15 must be opened in order to access filter 30 for replacement of cartridge 42, cessation of the flow of water to filter 30 when cartridge 42 is replaced is thereby insured.

It should be noted that with the water flow arrangement of FIG. 2, pressurized water lines are disposed inside the refrigerator 10. More particularly, conduit 33, 39, and 40 carry continuously pressurized water. Since conduit 40, at a minimum, and possibly conduit 33 and 39 additionally, are disposed inside refrigerator 10, they are susceptible to freezing and consequently breaking. With the water carried in the conduit being under line pressure, a break in the conduit may cause severe flooding. One way to significantly minimize the extent of potential flooding from the conduit freezing and breaking is described in conjunction with FIG. 3.

Figure 3:
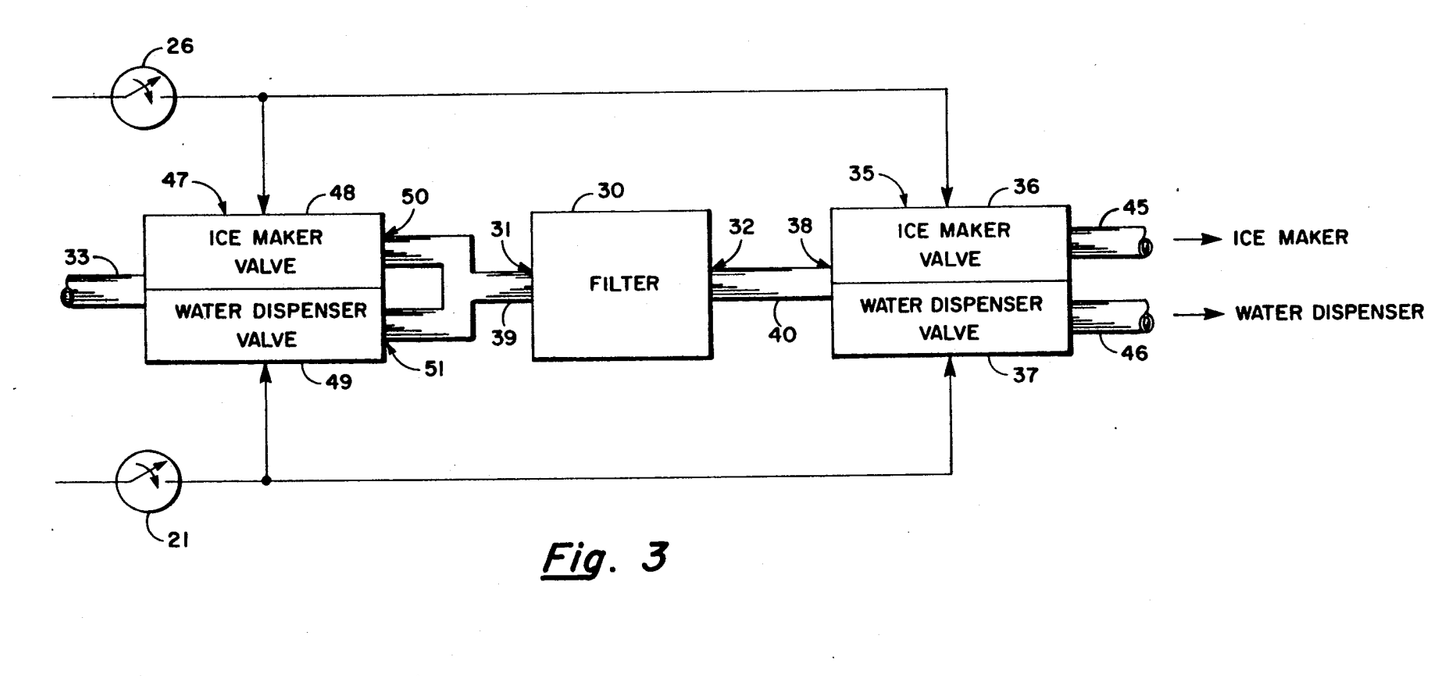
FIG. 3 is a schematic block diagram of an alternate water flow arrangement for use in the refrigerator of FIG. 1.

Referring now to FIG. 3, an alternate arrangement for controlling the flow of water in refrigerator 10 includes a valve arrangement 47 coupled to conduit 33 and comprising a pair of valves 48 and 49. Conduit 33 and valve arrangement 47 are disposed outside of the refrigerator 10 for reasons to be described hereinafter. Valve 48 regulates the flow of water to icemaker 25 and valve 49 controls the flow of water to water dispenser 20. The output ports 50 and 51 of valves 48 and 49, respectively, are coupled together by conduit 39 and are further coupled to the input port 31 of filter 30, as shown. As described above in conjunction with FIG. 2, output port 32 of filter 30 is coupled to the input port 38 of valve arrangement 35 by conduit 40. Valve arrangement 35 includes a pair of valves 36 and 37, with valve 36 controlling the flow of water to icemaker 25 and valve 37 controlling the flow of water to water dispenser 20.

As previously mentioned, icemaker valve 36 is controlled by water flow switch 26 and water dispenser valve 37 is controlled by water dispensing switch 21, as is conventional. Here, however, switches 26 and 21 additionally control icemaker valve 48 and water dispenser valve 49, respectively.

In operation, when water flow switch 26 is activated, valves 48 and 36 are opened thereby permitting the flow of water through conduit 33, valve 48, conduit 39, filter 30, conduit 40, valve 36, and conduit 45 to icemaker 25. Similarly, when water dispensing switch 21 is activated, water dispenser valves 49 and 37 are opened permitting a flow of water therethrough and to water dispenser 20.

From the above description, it is apparent that water will not flow into the refrigerator 10 unless water dispenser switch 21 or water flow switch 26 is activated. With this arrangement, and in particular with conduit 33 and valve arrangement 47 disposed outside of refrigerator 10, the presence of pressurized water lines inside the refrigerator 10 on a continuous basis is avoided. This arrangement may be desirable because conduit carrying water inside the refrigerator 10 is susceptible to freezing which may cause the conduit to break and water to spill out. By providing an arrangement in which pressurized water flows in the refrigerator 10 only when necessary for use by the icemaker 25 and water dispenser 20 features, the extent of the potential flooding is greatly reduced. In other words, if conduit 39, for example were to freeze and break, only the residual water in the conduit would spill out, rather than having water continuously run out.

Figure 4A:
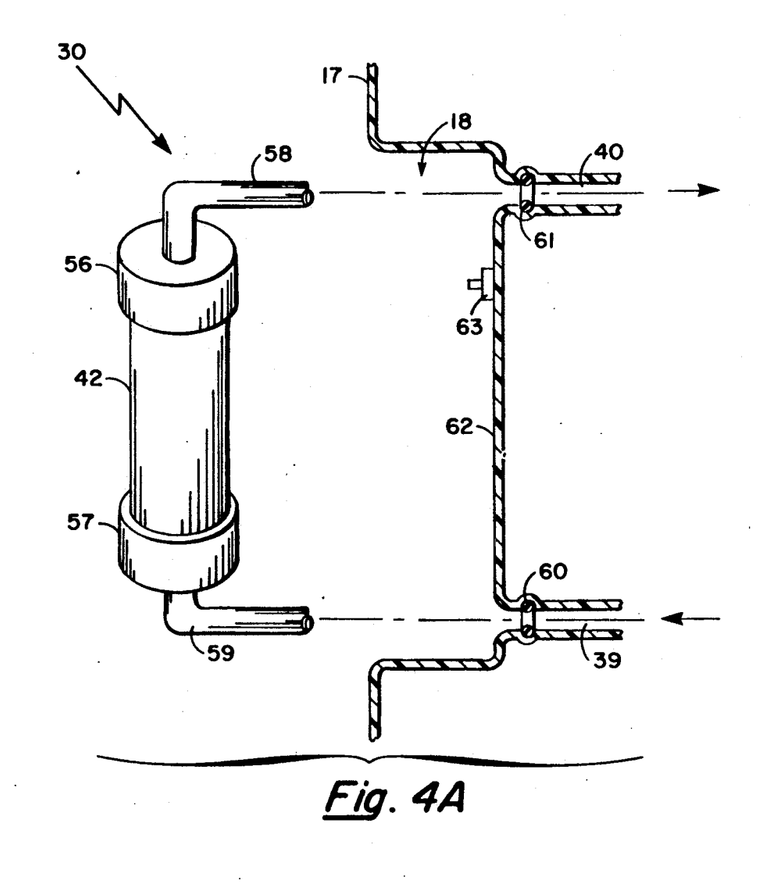
FIGS. 4A-4D are diagrammatical views of alternate embodiments of the refrigerator water filter system of FIG. 1.

Referring now also to FIG. 4A, an embodiment of refrigerator filter 30 includes filter cartridge 42. Here, filter cartridge 42 is an "Instapure" filter cartridge made by Teledyne Water Pik of Fort Collins, Colo., Model IR-30. Cartridge 42 includes input port 31 (FIG. 4B) at an end thereof and output port 32 at the opposite end of the cylindrical cartridge 42. End caps 56 and 57 are disposed over opposing ends of cylindrical filter cartridge 42. The ends 43 and 44 (see FIG. 4B) of cartridge 42 are threaded and the inside of end caps 56 and 57 are also threaded to mate with the threaded ends 43 and 44 of cartridge 42. Each of end caps 56 and 57 has a hollow interconnecting tube 58 and 59, respectively, protruding therefrom at a right angle as shown.

Conduit 39 terminates at recess 18 and has a rubber O-ring 60 disposed therein, as shown. Conduit 40 originates at recess 18 and similarly has an 0-ring 61 disposed therein. Recess 18 has a rear wall 62 on which is disposed a microswitch 63. Microswitch 63 may be used to control valve 34 (FIG. 2) in place of separate switch 41, door switch 23, or microswitch 22 disposed adjacent to recess 18, as described above.

In order to install filter 30 in recess 18, the filter 30 is aligned with conduit 39 and 40 to mate therewith. More specifically, interconnecting tube 58 of end cap 56 mates with conduit 40 and is inserted through 0-ring 61. Similarly, interconnecting tube 59 of end cap 57 mates with conduit 39 and is inserted through 0-ring 60. 0-rings 60 and 61 provide a seal to prevent water carried by conduit 39 and 40 from leaking into recess 18 or refrigeration compartment 12.

Figure 4B:
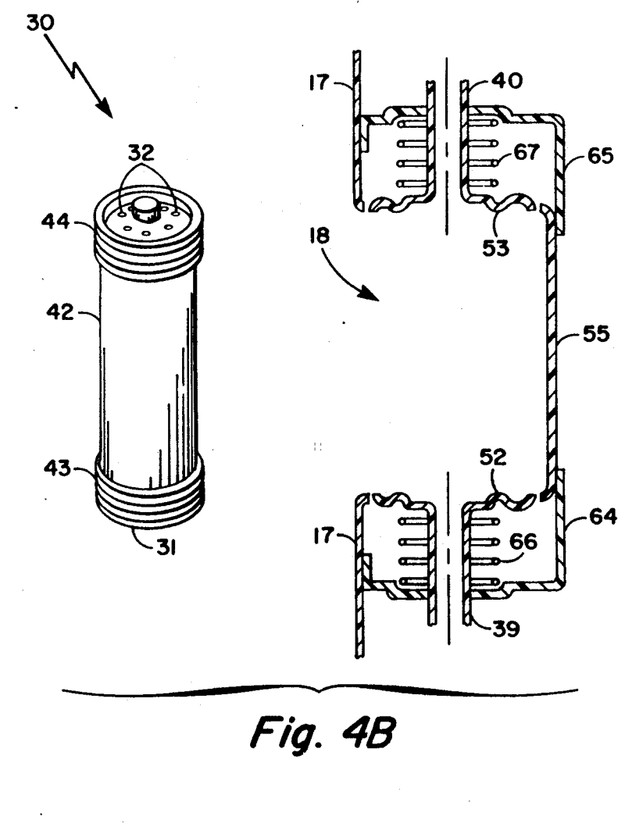

When filter 30 is in place in recess 18 and valve 34 is open, water flows through conduit 39, hollow interconnecting tube 59, and into filter cartridge 42 through input port 31 (FIG. 4B). In cartridge 42, the water passes through a carbon portion which removes common water contaminants. The water exits cartridge 42 through output port 32, hollow interconnecting tube 58 and flows into conduit 40. As mentioned above, switch 63 may be used to control valve 34 such that, when switch 63 is activated, normally open valve 34 is closed. When cartridge 42 is installed in recess 18, microswitch 63 is in a de-activated state. In particular, end cap 56 will contact switch 63 to de-activate such switch 63. However, when filter 30 is removed from recess 18 and end cap 56 no longer contacts switch 63, such switch 63 is activated and causes valve 34 to close. In other words, as the removal of filter 30 commences and filter 30 is pulled outward from recess 18, switch 63 is activated and causes valve 34 to close, thus stopping the flow of water into the refrigerator 10. In this way, the water flow is stopped automatically as removal of filter 30 begins and before interconnecting tubes 58 and 59 of end caps 56 and 57, respectively, are completely removed from conduit 40 and 39, respectively, to ensure that water will not flow into conduit 39 and, thus, into the recess 18 and refrigeration compartment 12 when the filter 30 is not in place.

Referring now to FIG. 4B, an alternate embodiment of the present invention includes a filter 30 having a filter cartridge 42. Such cartridge 42 has an input port 31 and output ports 32 as shown. Also shown are the threaded ends 43 and 44 of filter cartridge 42. Side wall 17 of refrigerator 10 has a recess 18 disposed therein, here, recess 18 being defined by rear recess wall 55 and flanges 52 and 53 of conduit 39 and 40, respectively. A support member 64 is securely attached to refrigerator side wall 17 and to rear recess wall 55 by any suitable means. Similarly, a support member 65 is securely attached to refrigerator side wall 17 and to rear recess wall 55, again by any suitable means. As mentioned, conduit 39 has a flange 52 disposed at the end thereof which terminates at recess 18. Conduit 40 similarly includes a flange 53 disposed at the end thereof originating at recess 18. Flanges 52 and 53 are complimentary shaped with respect to the ends 43 and 44 of filter cartridge 42. A spring 66 is disposed externally around conduit 39 between support member 64 and flange 52. More particularly, spring 66 is securely attached to support member 64 such that when force is exerted on flange 52, spring 66 is biased to a compressed position and flange 52 moves downward. Similarly, a spring 67 is securely attached to support member 65 and is disposed between support member 65 and flange 53. Thus, when force is exerted on flange 53 spring 67 is biased to a compressed position and flange 53 moves upward accordingly.

Figure 4C:
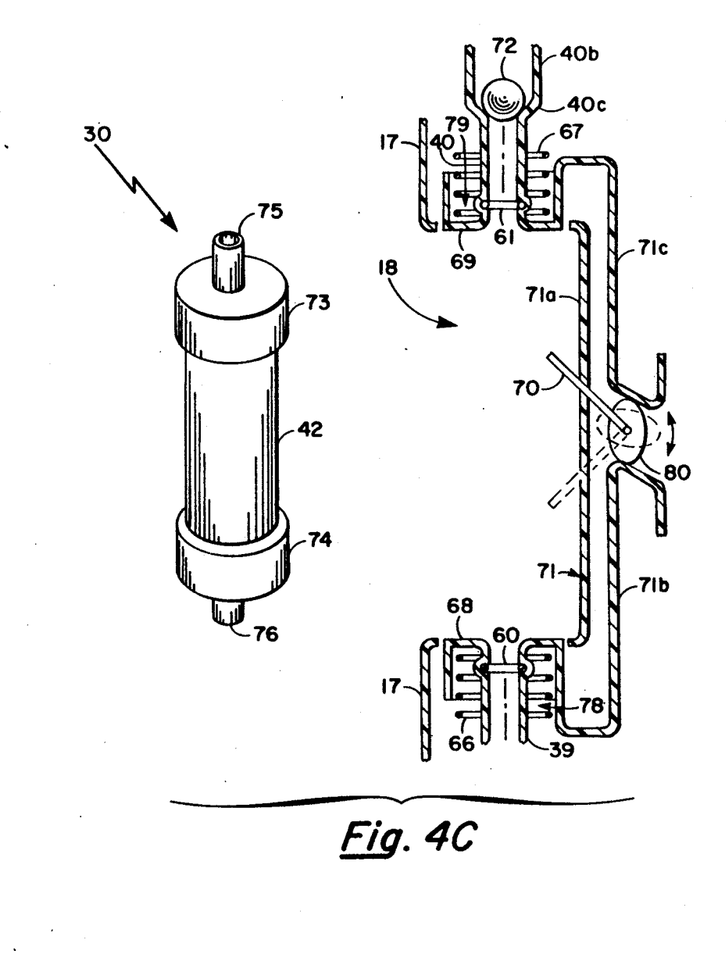

Filter cartridge 42 is installed in recess 18 by moving such cartridge 42 into alignment with conduit 39 and 40. More particularly, when cartridge 42 is moved toward rear recess wall 55, the ends 43 and 44 of cartridge 42 exert force on flanges 52 and 53. This force on flanges 52 and 53 biases springs 66 and 67, respectively, to a compressed position. As cartridge 42 is moved further toward rear recess wall 55, the ends 43 and 44 of cartridge 42 come to rest against flange 52 and 53, respectively. When cartridge ends 43 and 44 are in place against complimentary shaped flanges 52 and 53, respectively, the bias on springs 66 and 67, respectively, is removed causing such springs 66 and 67 to expand. The expansion of springs 66 and 67 causes cartridge 42 to be held securely in place. Referring now to FIG. 4C, an alternate embodiment of the present invention includes filter 30 having filter cartridge 42 and a pair of end caps 73 and 74 disposed over opposite ends of cartridge 42. Cartridge 42 has an input port 31 disposed under end cap 74 and an output port 32 disposed under end cap 73. Protruding axially from end cap 73 is a hollow interconnecting tube 75 and, similarly, a hollow interconnecting tube 76 protrudes axially from end cap 74.

Refrigerator wall 17 includes recess 18 having a rear wall 71. Here, rear wall 71 includes a first portion 71a as shown. A second portion 71b of rear wall 71 is coupled to, integrally formed with, a flange 68 of conduit 39. A cavity 78 is defined by wall portion 71b, flange 68, and conduit 39 as shown. A spring 66 is disposed in cavity 78 and is securely attached to conduit 39 such that when force is exerted on flange 68, spring 66 is biased to a compressed position. A third portion 71c of recess rear wall 71 is coupled to, or integrally formed with, a flange 69 of conduit 40, as shown. Wall portion 71c, flange 69, and conduit 40 define a cavity 79 in which a spring 67 is disposed. Spring 67 is securely attached to conduit 40 such that when force is exerted on flange 69, spring 67 is biased to a compressed position. Flanges 68 and 69 are spaced from refrigerator wall 17 and recess rear wall portion 71a, as shown, so that flanges 68 and 69 can move while wall 17 and wall portion 71a remain stationary. O-rings 60 and 61 are disposed in conduit 39 and 40, respectively, at the ends thereof which terminate and originate, respectively, at recess 18 as shown. Conduit 40 has a portion 40b which is diametrically larger than a portion thereof which originates at recess 18, as shown. Disposed in conduit portion 40b and resting on a flared portion 40c thereof is a spherical plug 72, the operation of which will be described hereinafter. Portions 71b and 71c of recess rear wall 71 are coupled together via a cam 80. A lever 70 is coupled to cam 80 to move the cam 80 with respect to rear wall portions 71b and 71c as will be described.

More particularly, in order to install filter 30, lever 70 and cam 80 are positioned as shown by solid lines. With cam 80 in this vertically oriented position, wall portions 71b and 71c are forced apart causing flange 68 of conduit 39 and flange 69 of conduit 40 to move in opposite directions in accordance with the movement of wall portions 71b and 71c. In this manner, flanges 68 and 69 exert force on springs 66 and 67, respectively, biasing such springs 66 and 67 to compressed positions. Filter 30 may then be moved into alignment with conduit 39 and 40. In other words, with lever 70 positioned as shown by the solid lines, filter 30 is moved so that interconnecting tube 75 is aligned with conduit 40 and interconnecting tube 76 is aligned with conduit 39. While holding filter 30 in place, lever 70 is then moved into the position shown by the dotted lines, thus causing cam 80 to be rotated to the substantially horizontal position shown in dotted lines. The effect of the movement of lever 70 to the position shown in dotted lines is that the bias on springs 66 and 67 is removed allowing such springs 66 and 67 to expand. This motion causes flanges 68 and 69 to contact end caps 74 and 73, respectively, to hold cartridge 42 securely in place. It should be noted that lever 70 is positioned so that such lever 70 is easily accessed when filter 30 is disposed in recess 18.

Conversely, when filter 30 is removed from recess 18, lever 70 is moved from the position shown in dotted lines to that shown in solid lines, thus causing flanges 68 and 69 to move away from one another and biasing springs 66 and 67, respectively, to compress such springs 66 and 67. Filter 30 may now be removed from recess 18 by simply pulling cartridge 42 out of recess 18.

When filter 30 is removed from recess 18, some residual water disposed in conduit 40 may leak out of conduit 40 through O-ring 61 and into refrigerator compartment 12 (FIG. 1). Spherical plug 72 effectively eliminates the potential problem of water leaking into refrigerator compartment 12 by plugging the conduit 40 so that any residual water remaining therein is blocked from flowing through O-ring 61 and into refrigerator compartment 12. The potential leaking problem is eliminated without restricting the flow of water through conduit 40 during normal operation (when the filter 30 is in place in recess 18). In operation, when water flows through cartridge 42 and up through conduit 40, spherical plug 72 is displaced from its resting position on flared portion 40c of conduit 40 by the force of the water flow, thereby allowing a flow of water through conduit 40. Spherical plug 72 may be used in conjunction with the embodiments of FIGS. 4A and 4B, as well as with the embodiment of FIG. 4C to be described hereinafter, in order to eliminate the potential problem of residual water from conduit 40 leaking into recess 18 and into refrigeration compartment 12.

It may be desirable to have lever 70 coupled to a switch, such as switch 41 (FIG. 2) which controls valve 34. With this arrangement, as lever 70 is moved so that cam 80 is in its substantially vertical position (shown by solid lines), prior to removal of filter 30, valve 34 is closed. In other words, the water supply to the refrigerator 10 is shut off as the removal of filter 30 is commenced by the movement of lever 70. Thus, the possibility of forgetting to shut off the water supply prior to removing filter 30 is avoided.

Figure 4D:
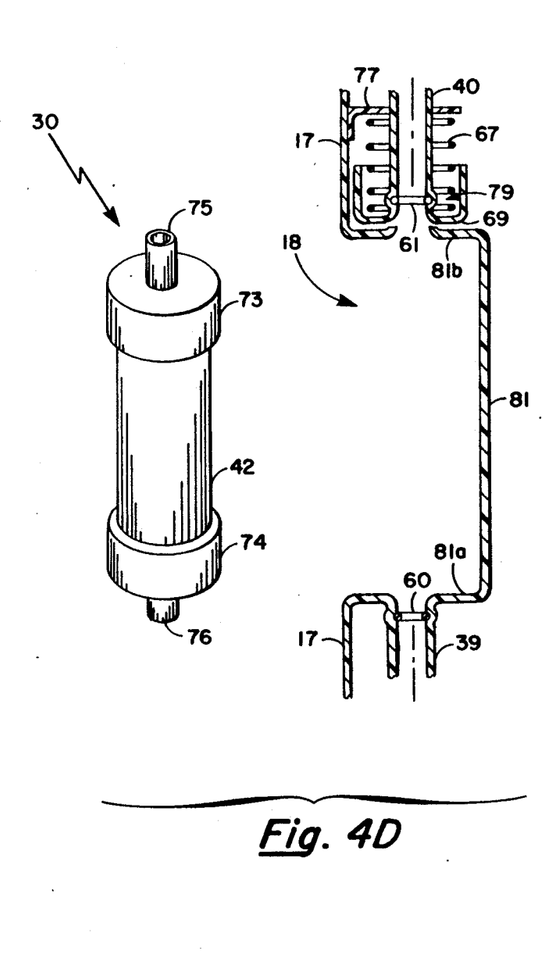

In FIG. 4D, a further embodiment of the present invention includes filter 30 having filter cartridge 42 and end caps 73 and 74 with corresponding hollow interconnecting tubes 75 and 76, respectively, as described above in conjunction with FIG. 4C. Again, wall 17 of refrigeration compartment 12 has a recess 18 disposed therein into which conduit 39 terminates and from which conduit 40 originates. Recess 18 includes rear wall 81 having a first end forming a flange 81a and a second end forming a flange 81b. Conduit 40 has an O-ring 61 disposed therein at the end thereof which originates in recess 18. Similarly, conduit 39 has an O-ring 60 disposed therein at the end thereof terminating in recess 18, as shown. A support member 77 is securely attached to refrigerator wall 17 and to conduit 40, as shown. Conduit 40 includes flange 69 disposed at the end thereof A cavity 79 is defined by conduit 40 and flange 81b and has a spring 67 disposed therein. Spring 67 is securely attached to support member 77 such that when force is exerted on flange 81b in an upward direction, spring 67 is biased to a compressed position.

In order to install filter 30 in recess 18, interconnecting tube 75 is placed in alignment with conduit 40 and, more particularly, with O-ring 61. Filter 30 is then pushed upward so that end cap 73 contacts flange 81b and pushes such flange 81b upward. In turn, flange 81b contacts flange 69 and exerts force on such flange 69 to bias spring 67 to a compressed position. With spring 67 thus displaced, end cap 74 may be moved into place in alignment with conduit 39. More particularly, as interconnecting tube 75 is being pushed upward, interconnecting tube 76 is aligned with conduit 39 and then released. Once filter 30 is released, the bias on spring 67 is removed and spring 67 expands to hold filter 30 securely in place.

Figure 5:
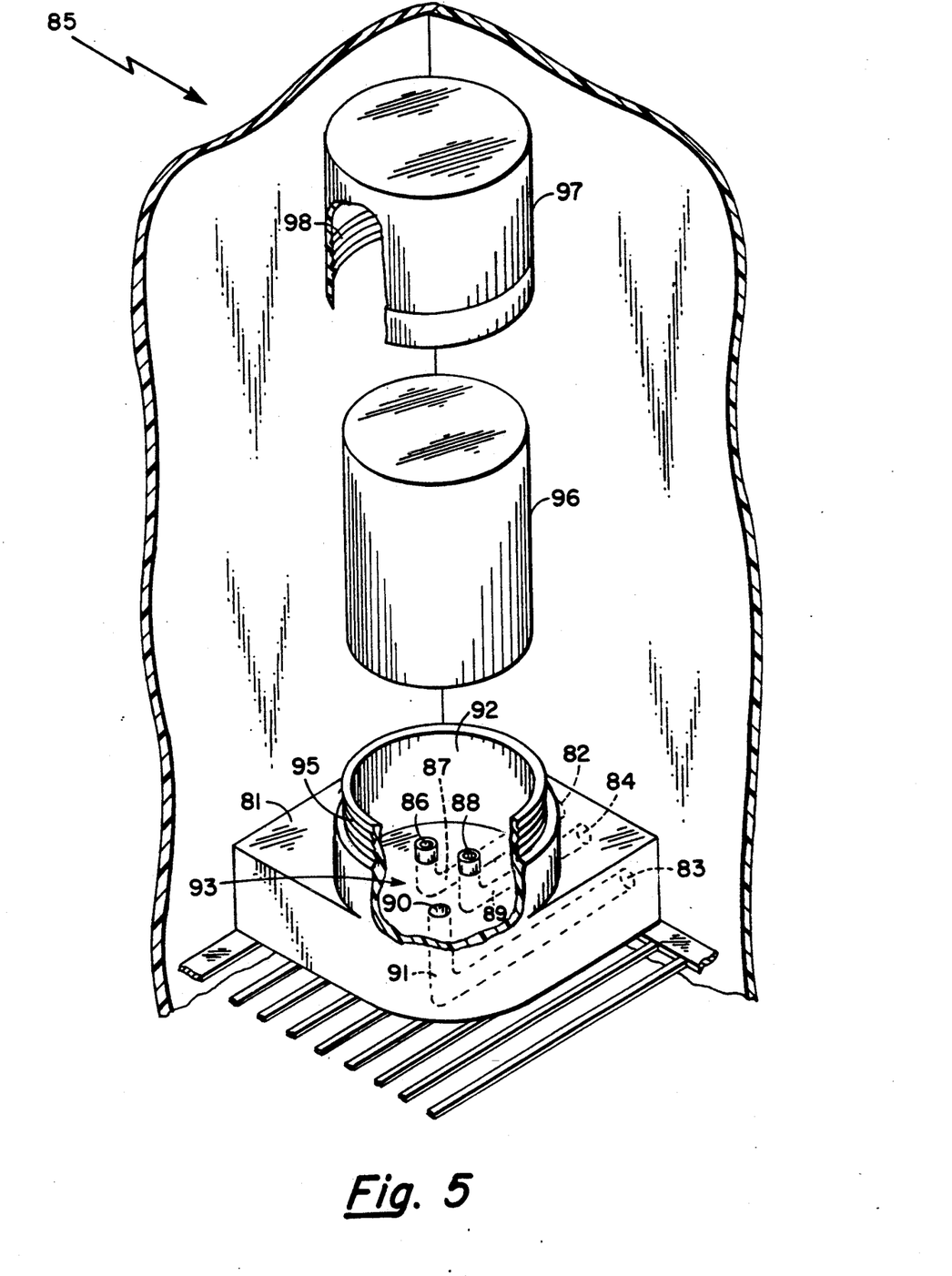
FIG. 5 is an exploded isometric view of a refrigerator filter device in accordance with an alternate embodiment of the present invention.

Referring now to FIG. 5, an alternate embodiment of the present invention includes a refrigerator filter device 85. Filter 85 includes a housing 81, here made of plastic, and having a water inlet 82, a water outlet 83, and a drain outlet 84. Water inlet 82 is coupled to conduit 39 (FIGS. 2 and 3) and water outlet 83 is coupled to conduit 40 (FIGS. 2 and 3). Housing 81 includes a recess 93 in which is disposed a first port 86 which is coupled to water inlet 82 via duct 87. Recess 93 further has a second port 88 disposed therein which is coupled to water outlet 83 via a duct 89, as shown. Also disposed in recess 93 is a drain port 90 which is coupled to drain outlet 84 by means of duct 91. Recess 93 has a side wall 92, a top portion 95 of which is threaded.

In operation, a filter cartridge 96 is disposed in recess 93. Here, filter cartridge 96 is an "Instapure" filter made by Teledyne Water Pik of Fort Collins, Colorado, Model No. R-2C. Cartridge 96 has an input port 31 (FIGS. 2 and 3) and an output port 32 (FIG. 2) both of which are disposed in a bottom surface thereof (not shown). Cartridge 96 is disposed in recess 93 so that input port 31 is aligned with first port 86 and, thus, is coupled to water inlet 82. In alignment, output port 32 of cartridge 96 is aligned with second port 88, and is, thus, coupled to water outlet 83. With this arrangement, water enters the filter cartridge 96 through input port 31, passes through a carbon portion that filters common water contaminants and exits cartridge 96 through output port 32.

A cover 97 is disposed over cartridge 96 which, in turn is disposed over recess 93. Cover 97 has a bottom interior portion 98 which is threaded such that when cover 97 is disposed over cartridge 96, threaded portion 98 mates with threaded portion 95 of recess side wall 92 and ca be screwed onto such side wall 92. When cartridge 96 is replaced, cover 97 is unscrewed and removed. Filter cartridge 96 may then be lifted up and out of recess 93.

As described previously in conjunction with the embodiments of FIGS. 4A-4D, some residual water in conduit 40 may leak out when cartridge 96 is removed. In the present embodiment, the water will leak into recess 93 and down through drain port 90, drain duct 91, and to conduit (not shown) coupled thereto for appropriate disposal. In other words, drain port 90 channels residual water from recess 93 and out of such recess 93 so that it does not spill over side wall 92 and into refrigeration compartment 12, thereby avoiding such water leaking into refrigeration compartment 12.

Here, filtration device 85 is shown disposed in the corner of a shelf in refrigeration compartment 12. Alternatively, such filtration device 85 may be disposed in a recess within a wall of refrigeration compartment 12, or in the refrigerator door, in order to minimize the reduction of usable volume in compartment 12 for storing food. Furthermore, the switch arrangements described above in conjunction with FIGS. 2-4 for controlling shut off valve 34 (FIG. 2) or valve arrangement 47 (FIG. 3) may be employed in conjunction with the embodiment of FIG. 5. In other words, the water supply to filter device 85 may be shut off by means of door switch 23 or any other suitable switch arrangement which insures that the flow of water to filter 30 is shut off prior to removal of cartridge 96.

Having described preferred embodiments of the invention, it will now become apparent to one of skill in the art such other embodiments incorporating their concepts may be used. It is felt, therefore, that these embodiments should not be limited to disclose embodiments but rather should be limited only by the spirit and scope of the appended claims.

What is claimed is:

1. A refrigerator comprising:
   an outer cabinet;
   a refrigeration compartment disposed within said outer cabinet and having a rear wall, a pair of opposing side walls, and a door disposed opposite said rear wall;
   a freezer compartment disposed in said outer cabinet and adjacent to said refrigeration compartment;
   a water dispenser disposed in said door and having a water dispensing switch;
   a filter disposed in said refrigeration compartment and having an input port and an output port, wherein said output port is selectively coupled to said water dispenser in response to activation of said water dispensing switch;
   means for providing a flow of water to said input port of said filter;
   a valve disposed between said water flow providing means and the input port of said filter; and
   means responsive to the removal of said filter for closing said valve.

2. The refrigerator recited in claim 1 wherein one of said walls has a recess disposed therein and said filter is disposed in said recess.

3. The refrigerator recited in claim 1 further comprising means responsive to activation of said water dispensing switch for opening said valve.

4. A refrigeration comprising:
   an outer cabinet;
   a refrigeration compartment disposed within said outer cabinet and having a rear wall, a pair of opposing side walls, and a door disposed opposite said rear wall;
   a freezer compartment disposed in said outer cabinet and adjacent to said refrigeration compartment;
   a water dispenser disposed in said door and having a water dispensing switch;
   a filter disposed in said refrigeration compartment and having an input port and an output port, wherein said output port is selectively coupled to said water dispenser in response to activation of said water dispensing switch and wherein one of said walls has a recess disposed therein and said filter is disposed in said recess;

means for providing a flow of water to said input put of said filter;

a valve disposed between said water flow providing means and the input port of said filter;

a cover disposed over said recess and adapted for being in an open position to permit access to said filter and for being in a closed position to prevent access to said filter; and means responsive to the position of said cover for controlling said valve, wherein said valve is closed when said cover is in an open position and said valve is open when said cover is in a closed position.

5. A refrigerator comprising:

an outer cabinet;

a refrigeration compartment disposed within said outer cabinet and having a rear wall, a pair of opposing side walls, and a door disposed opposite said rear wall;

a freezer compartment disposed in said outer cabinet and adjacent to said refrigeration compartment;

a water dispenser disposed in said door and having a water dispensing switch;

a filter disposed in said refrigeration compartment and having an input port and an output port, wherein said output port is selectively coupled to said water dispenser in response to activation of said water dispensing switch;

means for providing a flow of water to said input port of said filter;

a valve disposed between said water flow providing means and the input port of said filter; and means responsive to said door being open for closing said valve.

6. A refrigerator comprising:

an outer cabinet;

a refrigeration compartment disposed within said outer cabinet and having a rear wall, a pair of opposing side walls, and a door disposed opposite said rear wall;

a freezer compartment disposed in said outer cabinet and adjacent to said refrigeration compartment;

an ice making device disposed in said freezer compartment and having a water flow switch;

a filter disposed in said refrigeration compartment and having an input port and an output port, wherein said output port is selectively coupled to said ice making device in response to activation of said water flow switch;

means for providing a flow of water to said input port of said filter;

a valve disposed between said water flow providing means and the input port of said filter; and means responsive to the removal of said filter for closing said valve.

7. The refrigerator recited in claim 6 wherein one of said walls has a recess disposed therein and said filter is disposed in said recess.

8. The refrigeration recited in claim 6 further comprising means responsive to activation of said water flow switch for opening said valve.

9. A refrigerator comprising:

an outer cabinet;

a refrigeration compartment disposed within said outer cabinet and having a rear wall, a pair of opposing side walls, and a door disposed opposite said rear wall;

a freezer compartment disposed in said outer cabinet and adjacent to said refrigeration compartment;

an ice making device disposed in said freezer compartment and having a water flow switch, wherein one of said walls has a recess disposed therein and said filter is disposed in said recess;

a filter disposed in said refrigeration compartment and having an input port and an output port, wherein said output port is selectively coupled to said ice making device in response to activation of said water flow switch;

means for providing a flow of water to said input port of said filter;

a valve disposed between said water flow providing means and the input port of said filter; and a cover disposed over said recess and adapted for being in an open position to permit access to said filter and for being in a closed position to prevent access to said filter; and means responsive to the position of said cover for controlling said valve, wherein said valve is closed when said cover is in an open position and said valve is open when said cover is in a closed position.

10. A refrigerator comprising:

an outer cabinet;

a refrigeration compartment disposed within said outer cabinet and having a rear wall, a pair of opposing side walls, and a door disposed opposite said rear wall;

a freezer compartment disposed in said outer cabinet and adjacent to said refrigeration compartment;

an ice making device disposed in said freezer compartment and having a water flow switch;

a filter disposed in said refrigeration compartment and having an input port and an output port, wherein said output port is selectively coupled to said ice making device in response to activation of said water flow switch;

means for providing a flow of water to said input port of said filter;

a valve disposed between said water flow providing means and the input port of said filter; and means responsive to said door being open for closing said valve.

11. A refrigerator comprising:

an outer cabinet;

a refrigeration compartment disposed within said outer cabinet and having a rear wall, a pair of opposing side walls, and a door disposed opposite said rear wall;

a freezer compartment disposed in said outer cabinet and adjacent to said refrigeration compartment;

a water dispenser disposed in said door and having a water dispensing switch;

an ice making device disposed in said freezer compartment and having a water flow switch;

a filter disposed in said refrigeration compartment and having an input port and an output port, wherein said output port is selectively coupled to said water dispenser in response to activation of said water dispensing switch and to said ice making device in response to activation said water flow switch;

means for providing a flow of water to said input port of said filter;

a valve disposed between said water flow providing means and the input port of said filter; and means responsive to the removal of said filter for closing said valve.

12. A refrigerator comprising:
an outer cabinet;
a refrigeration compartment disposed within said outer cabinet and having a rear wall, a pair of opposing side walls, and a door disposed opposite said rear wall;
a freezer compartment disposed in said outer cabinet and adjacent to said refrigeration compartment;
a water dispenser disposed in said door and having a water dispensing switch;
an ice making device disposed in said freezer compartment and having a water flow switch;
a filter disposed in said refrigeration compartment and having an input port and an output port, wherein said output port is selectively coupled to said water dispenser in response to activation of said water dispensing switch and to said ice making device in response to activation said water flow switch, wherein one of said walls has a recess disposed therein and said filter is disposed in said recess;
means for providing a flow of water to said input port of said filter;
a valve disposed between said water flow providing means and the input port of said filter; and
a cover disposed over said recess and adapted for being in an open position to permit access to said filter and for being in a closed position to prevent access to said filter; and
means responsive to the position of said cover for controlling said valve, wherein said valve is closed when said cover is in an open position and said valve is open when said cover is in a closed position.

13. A refrigerator comprising:
an outer cabinet;
a refrigeration compartment disposed within said outer cabinet and having a rear wall, a pair of opposing side walls, and a door disposed opposite said rear wall;
a freezer compartment disposed in said outer cabinet and adjacent to said refrigeration compartment;
a water dispenser disposed in said door and having a water dispensing switch;
an ice making device disposed in said freezer compartment and having a water flow switch;
a filter disposed in said refrigeration compartment and having an input port and an output port, wherein said output port is selectively coupled to said water dispenser in response to activation of said water dispensing switch and to said ice making device in response to activation said water flow switch;
means for providing a flow of water to said input port of said filter;
a valve disposed between said water flow providing means and the input port of said filter; and
means responsive to said door being open for closing said valve.

14. The refrigerator recited in claim 13 wherein said valve comprises a first valve coupled to said water flow switch and a second valve coupled to said water dispensing switch.

15. A refrigerator comprising:
an outer cabinet;
a refrigeration compartment disposed within said outer cabinet and having a rear wall, opposing side walls, and a door disposed opposite said rear wall;
a freezer compartment disposed in said outer cabinet and adjacent to said refrigeration compartment;
a water dispenser disposed in said door;
means disposed in said refrigeration compartment for filtering water, said filter means comprising a water filtration cartridge having an input port and an output port; and
means coupled to said water dispenser for carrying water to said water dispenser, said water carrying means comprising a first water line having an end coupled to said input port and a second water line having an end coupled to said output port, wherein one of said ends of said first and second water liens has a spring coupled thereto and includes means responsive to insertion of said water filtering means for biasing said spring to a compressed position.

16. The refrigerator recited in claim 15 wherein said filtering means further comprises a first end cap disposed over said input port, said first end cap adapted for mating with said end of said first water line and a second end cap disposed over said output port, said second end cap adapted for mating with said end of said second water line.

17. The refrigerator recited in claim 16 wherein said end of said first water line has an O-ring disposed therein and wherein said end of said second water line has an O-ring disposed therein.

18. A refrigerator comprising:
an outer cabinet;
a refrigeration compartment disposed within said outer cabinet and having a rear wall, opposing side walls, and a door disposed opposite said rear wall;
a freezer compartment disposed in said outer cabinet and adjacent to said refrigeration compartment;
an ice making device disposed in said freezer compartment;
means disposed in said refrigeration compartment for filtering water, said filter means comprising a water filtration cartridge having an input port and an output port; and
means coupled to said ice making device for carrying water to said ice making device, said water carrying means comprising a first water line having an end coupled to said input port and a second water line having an end coupled to said output port, wherein one of said ends of said first and second water lines has a spring coupled thereto and includes means responsive to insertion of said water filtering means for biasing said spring to a compressed position.

19. The refrigerator recited in claim 18 wherein said filtering means further comprises a first end cap disposed over said input port, said first end cap adapted for mating with said end of said first water line and a second end cap disposed over said output port, said second end cap adapted for mating with said end of said second water line.

20. The refrigerator recited in claim 19 wherein said end of said first water line has an O-ring disposed therein and wherein said end of said second water line has an O-ring disposed therein.

21. A refrigerator comprising:
an outer cabinet;

a refrigeration compartment disposed within said outer cabinet and having a rear wall, opposing side walls, and a door disposed opposite said rear wall;

a freezer compartment disposed in said outer cabinet and adjacent to said refrigeration compartment;

a water dispenser disposed in said door;

an ice making device disposed in said freezer compartment;

means disposed in said refrigeration compartment for filtering water, said filter means comprising a water filtration cartridge having an input port and an output port; and means coupled to said water dispenser and to said ice making device for carrying water to said water dispenser and to said ice making device, said water carrying means comprising a first water line having an end coupled to said input port and a second water line having an end coupled to said output port, wherein one of said ends of said first and second water liens has a spring coupled thereto and includes means responsive to insertion of said water filtering means for biasing said spring to a compressed position.

22. The refrigerator recited in claim 21 wherein said filtering means further comprises a first end cap disposed over said input port, said first end cap adapted for mating with said end of said first water line and a second end cap disposed over said output port, said second end cap adapted for mating with said end of said second water line.

23. The refrigerator recited in claim 22 wherein said end of said first water line has an O-ring disposed therein and wherein said end of said second water line has an O-ring disposed therein.

24. A refrigerator comprising:

an outer cabinet;

a refrigeration compartment disposed within said outer cabinet and having a door;

a freezer compartment disposed in said outer housing and adjacent to said refrigeration compartment;

a water filtration device within said refrigeration compartment, said water filtration device comprising:

a housing having a water inlet, a water outlet, and a drain outlet;

a recess disposed within said housing, said recess having a first port coupled to said water inlet, a second port coupled to said water outlet, and a third port coupled to said drain outlet;

a water filtration cartridge disposed in said recess, said cartridge having an input port mated with said first port and an output port mated with said second port; and a cover disposed over said water filtration cartridge;

means for providing a flow of water to said input port of said water filtration cartridge;

a valve disposed between said water flow providing means and said input port of said water filtration cartridge; and means responsive to removal of said water filtration cartridge for closing said valve prior to removal of said cartridge.

25. The refrigerator recited in claim 24 further comprising:

a water dispenser disposed in said door and having a water dispenser switch;

an ice making device disposed in said freezer compartment and having a water flow switch; and means for selectively coupling said output port of said water filtration device to said water dispenser in response to activation of said water dispenser switch and to said ice making device in response to activation of said water flow switch, wherein said valve is opened in response to activation of said water dispenser switch or said water flow switch.

* * * * *